US008676492B2

(12) United States Patent
Litkouhi et al.

(10) Patent No.: US 8,676,492 B2
(45) Date of Patent: Mar. 18, 2014

(54) MAP-AIDED VISION-BASED LANE SENSING

(75) Inventors: Bakhtiar Brian Litkouhi, Washington, MI (US); Varsha Sadekar, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1708 days.

(21) Appl. No.: 11/335,248

(22) Filed: Jan. 19, 2006

(65) Prior Publication Data

US 2007/0168113 A1 Jul. 19, 2007

(51) Int. Cl.
*G01C 21/28* (2006.01)

(52) U.S. Cl.
USPC ........................................................ 701/409

(58) Field of Classification Search
USPC ............. 701/23–28, 201, 205–208, 241, 300, 701/301, 203, 223, 408, 409, 445, 519, 701/532; 340/995.12, 988, 936, 937, 907, 340/435, 436, 438, 426.24, 425.5; 348/113, 348/116, 118, 148; 382/104
See application file for complete search history.

(56) References Cited

U.S. PATENT DOCUMENTS

| | | | | |
|---|---|---|---|---|
| 5,483,453 A | * | 1/1996 | Uemura et al. | 701/23 |
| 5,904,725 A | * | 5/1999 | Iisaka et al. | 701/207 |
| 5,922,036 A | * | 7/1999 | Yasui et al. | 701/28 |
| 6,385,536 B2 | * | 5/2002 | Kimura | 701/209 |
| 6,411,889 B1 | * | 6/2002 | Mizunuma et al. | 701/117 |
| 6,411,901 B1 | * | 6/2002 | Hiwatashi et al. | 701/301 |
| 6,580,986 B1 | * | 6/2003 | Uenuma et al. | 701/41 |
| 6,741,186 B2 | | 5/2004 | Ross | 340/901 |
| 6,768,944 B2 | * | 7/2004 | Breed et al. | 701/301 |
| 6,813,370 B1 | * | 11/2004 | Arai | 382/104 |
| 6,819,779 B1 | * | 11/2004 | Nichani | 382/104 |
| 6,850,841 B1 | * | 2/2005 | Casino | 701/208 |
| 6,973,380 B2 | * | 12/2005 | Tange et al. | 701/70 |
| 7,016,517 B2 | * | 3/2006 | Furusho | 382/103 |
| 7,030,775 B2 | * | 4/2006 | Sekiguchi | 340/903 |
| 7,058,494 B2 | * | 6/2006 | Matsumoto et al. | 701/41 |
| 7,072,764 B2 | * | 7/2006 | Donath et al. | 701/200 |
| 7,113,866 B2 | * | 9/2006 | Taliwal | 701/208 |
| 7,224,290 B2 | * | 5/2007 | Takenaga et al. | 340/907 |
| 7,254,482 B2 | * | 8/2007 | Kawasaki et al. | 701/211 |
| 7,336,203 B2 | * | 2/2008 | Arquette et al. | 340/928 |
| 7,424,364 B2 | * | 9/2008 | Gern et al. | 701/301 |
| 7,510,038 B2 | * | 3/2009 | Kaufmann et al. | 180/169 |

(Continued)

FOREIGN PATENT DOCUMENTS

| | | |
|---|---|---|
| CN | 1707224 A | 12/2005 |
| DE | 19906614 A1 | 10/1999 |
| DE | 60202341 T2 | 12/2005 |
| EP | 1371948 A2 | 12/2003 |

OTHER PUBLICATIONS

German Office Action dated Jun. 3, 2011.

*Primary Examiner* — Thomas Black
*Assistant Examiner* — Sze-Hon Kong
(74) *Attorney, Agent, or Firm* — Cantor Colburn LLP

(57) ABSTRACT

A method for map-aided vision-based lane sensing. The method includes receiving map information corresponding to a current geographic position of a vehicle on a roadway. The map information includes the number of lanes on the roadway. Information about the number of lanes crossed by the vehicle on the roadway is received. It is determined which of the lanes on the roadway is currently occupied by the vehicle based on the map information and the number of lanes crossed by the vehicle on the roadway.

21 Claims, 3 Drawing Sheets

(56) References Cited

U.S. PATENT DOCUMENTS

| | | | |
|---|---|---|---|
| 7,555,367 B2* | 6/2009 | Kuge | 701/1 |
| 2002/0184236 A1* | 12/2002 | Donath et al. | 707/104.1 |
| 2003/0072471 A1* | 4/2003 | Otsuka et al. | 382/103 |
| 2004/0143381 A1* | 7/2004 | Regensburger et al. | 701/36 |
| 2004/0164851 A1 | 8/2004 | Crawshaw | 340/435 |
| 2004/0262063 A1 | 12/2004 | Kaufmann et al. | 180/169 |
| 2005/0004753 A1* | 1/2005 | Weiland et al. | 701/208 |
| 2005/0129279 A1* | 6/2005 | Unwin | 382/104 |
| 2005/0149251 A1* | 7/2005 | Donath et al. | 701/200 |
| 2005/0174223 A1* | 8/2005 | Egami et al. | 340/440 |
| 2006/0031008 A1* | 2/2006 | Kimura et al. | 701/208 |
| 2006/0106518 A1* | 5/2006 | Stam et al. | 701/49 |
| 2007/0021912 A1* | 1/2007 | Morita et al. | 701/211 |

\* cited by examiner

MAP-AIDED VISION-BASED LANE SENSING

BACKGROUND OF THE INVENTION

The present disclosure relates generally to vision-based lane sensing, and more particularly, to utilizing map software to assist in vision-based lane sensing.

Vision-based lane sensing (LS) systems detect roadway lane markings and can utilize this information for lane departure warning (LDW), road departure warning and lane keeping (LK) purposes in addition to other purposes (e.g., road geometry prediction). In general, the LS algorithms utilize information from both right and left lane markings to inform the driver of an inadvertent lane deviation, or to steer or keep the vehicle within the lane using, for example, electric power steering (EPS) or active front steering (AFS).

In most situations, the LS system utilizes the contrast between the lane marking and the pavement to detect the markings. For example, a bright white lane marking on black tar pavement can be detected by the image processor without too much difficulty. As this contrast deteriorates, so does the lane sensing performance. In this regard, it is more difficult for the image processor to detect yellow lane markings in a gray scaled image (and to a lesser degree color image) because of the lower intensities that they generate. At the same time, there is an abundance of yellow lane markings on roadways in the United States. For example, as shown in FIG. 1, freeways have yellow lane markings on the left side of the road. Another example, as shown in FIG. 2, is that two-way roads have yellow lane markings dividing the road. It would be very helpful to the vision system if it could be cued to the presence of such yellow colored markers so as to allow the vision system to better adjust its filters to recognize such lane markers. This would also result in reduced computational effort because the vision system would use algorithms directed to detecting yellow lane markings.

BRIEF DESCRIPTION OF THE INVENTION

According to one aspect of the invention, a method is provided for map-aided vision-based lane sensing. The method includes receiving map information corresponding to a current geographic position of a vehicle on a roadway. The map information includes the number of lanes on the roadway. Information about the number of lanes crossed by the vehicle on the roadway is received from a vision system. It is determined which of the lanes on the roadway is currently occupied by the vehicle based on the map information and the number of lanes crossed by the vehicle on the roadway.

In another aspect of the invention, a system is provided for map-aided vision-based lane sensing. The system includes an input device for receiving map information corresponding to a current geographic position of a vehicle on a roadway. The map information includes the number of lanes on the roadway. The input device also receives information about the number of lanes crossed by the vehicle on the roadway from the vision system. The system further includes a processor in communication with the input device. The processor includes instructions for facilitating determining which of the lanes on the roadway is currently occupied by the vehicle. The determining is based on the map information and the number of lanes crossed by the vehicle on the roadway.

In a further aspect of the invention, a computer program product is provided for map-aided vision-based lane sensing. The computer program product includes a storage medium readable by a processing circuit and storing instructions for execution by the processing circuit for performing a method. The method includes receiving map information corresponding to a current geographic position of a vehicle on a roadway. The map information includes the number of lanes on the roadway. Information about the number of lanes crossed by the vehicle on the roadway is received from the vision system. It is determined which of the lanes on the roadway is currently occupied by the vehicle based on the map information and the number of lanes crossed by the vehicle on the roadway.

BRIEF DESCRIPTION OF THE DRAWINGS

Referring now to the figures, which are meant to be exemplary embodiments, and wherein the like elements are numbered alike.

DETAILED DESCRIPTION OF THE INVENTION

To determine whether a lane marker is yellow, exemplary embodiments of the present invention utilize digital road maps, where such road attributes are available and can be provided to the lane sensing (LS) processor in advance. The image processor in the LS processor can utilize this information to adjust the algorithms and/or filters that it utilizes to detect lane markers. For example, the image processor could react by using a proper yellow filter (a typical yellow filter is $\alpha R + \beta G - \gamma B$ with typical values of $\alpha$, $\beta > 0.5$ and $\gamma < 0.2$) to enhance the detectability of yellow markers, without sacrificing the detectability of white markers. In addition, when the lane marker is white, the computational effort will be reduced by knowing that a lane marker is white.

On a freeway where the yellow lane marker is on the left side of the road (the leftmost lane), it is useful to know the number of lanes and the lane where the vehicle is traveling. This knowledge provides information about the color of the lane marker useful to the image processor for lane sensing purposes. The combination of global positioning system (GPS) coordinates, map software and a vision system can be utilized to identify the lane where the vehicle is traveling. The number of lanes in the roadway are provided by the map database. As the vehicle enters a road, the vision system can detect the lane markers and keep track of them as the vehicle changes lanes. In this manner, the lane determination software can determine which lane (e.g., lane number) the vehicle is traveling in.

Figure 2:
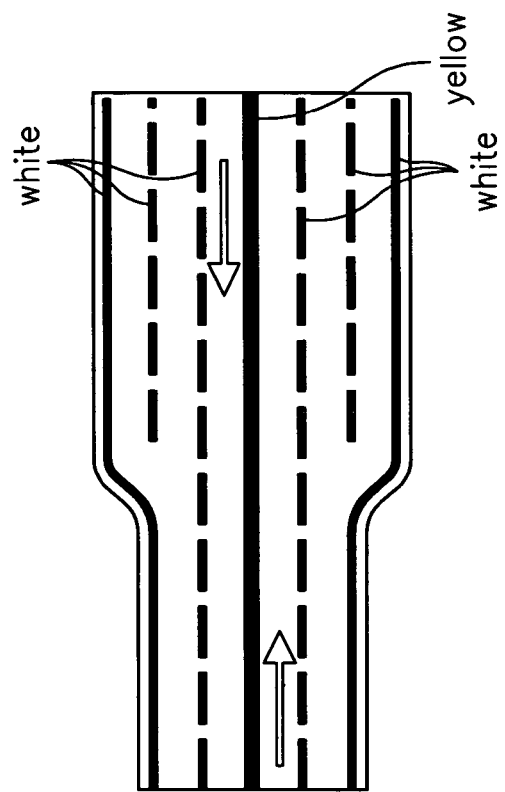
FIG. 2 is a block diagram of yellow markers on a divided roadway.
Figure 1:
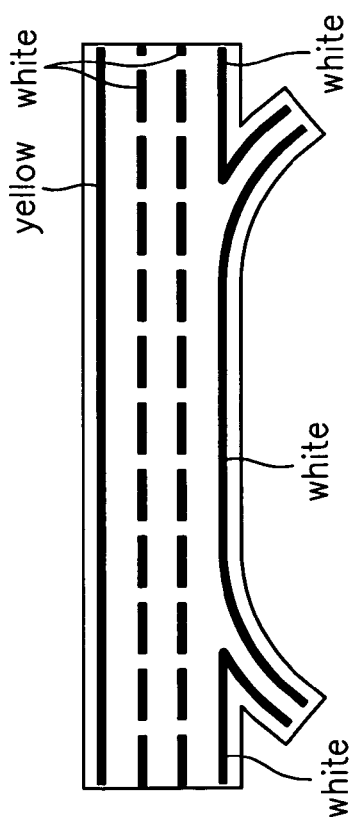
FIG. 1 is a block diagram of a highway with yellow markers on the left road boundary.
Figure 3:
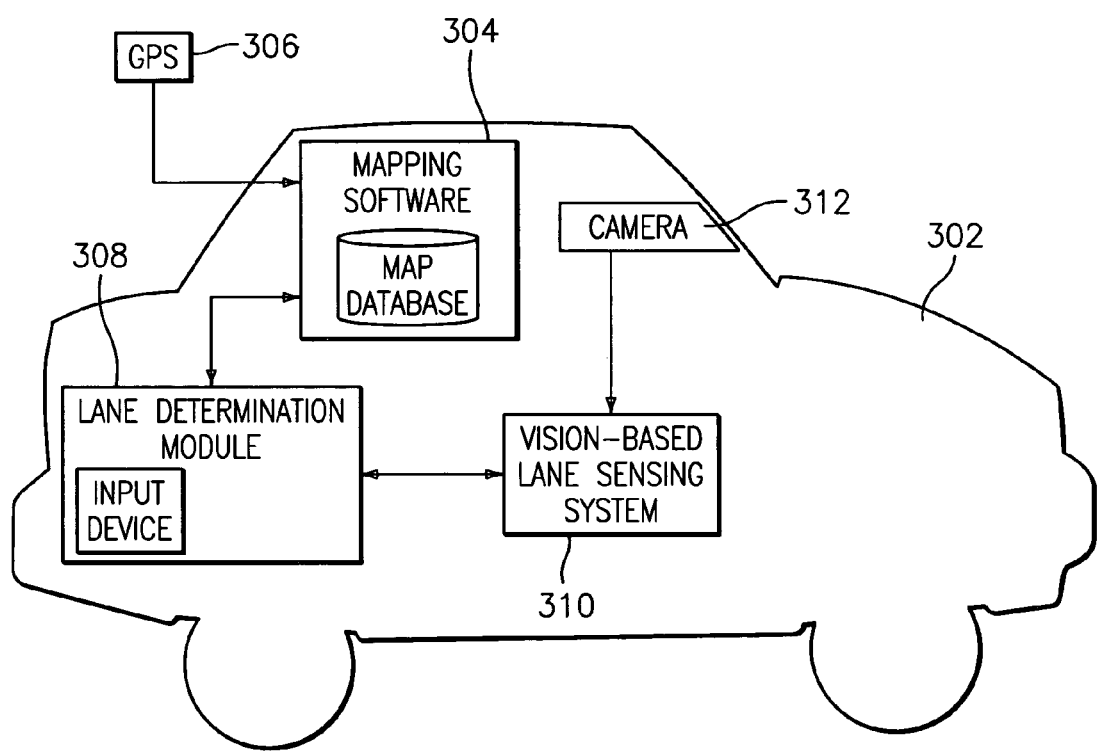
FIG. 3 is a block diagram of a system that may be implemented by exemplary embodiments of the present invention.

FIG. 3 is a block diagram of a system that may be implemented by exemplary embodiments. As depicted in FIG. 3, a vehicle 302 contains a lane determination module 308, a vision-based LS system 310 and map software 304. FIG. 3 also depicts a camera 312 which serves as an integral part of the vision-based LS system 310. The map software 304 may be implemented by any map software known in the art such as NAVTEQ and TeleAtlas. In addition, the map software 304 may be located internally to the vehicle 302 as depicted in FIG. 3, or alternatively the map software 304 may be located externally to the vehicle 302. The map software 304 includes a map database with map information. The map database may be stored in the same location as the map software 304 or all and/or portions of the map database may be stored in different geographic location that the maps software 304. The map software 304 is utilized by exemplary embodiments to provide map information, such as the number of lanes on a roadway, entrance point onto the roadway and roadway type and lane marker type, to the lane determination module 308. The map software 304 provides this information in response to a GPS coordinate (or other geographic location indicator).

The vision-based LS system 310 depicted in FIG. 3 may be implemented by any vision-based LS system known in the art such as Mobileye and Iteris. Data from the LS system 310 is utilized by exemplary embodiments to determine which lane in a roadway is currently occupied by the vehicle 302. In exemplary embodiments, the data includes information about how many lanes have been crossed by the vehicle 302 on a roadway and to determine which lane the vehicle is on. In addition, attribute information about the lane markers is transmitted to the LS system 310. The LS system 310 uses the attribute information to adjust filters and algorithms used by an image processor in the LS system 310 to detect lane markers.

The GPS 306, depicted in FIG. 3 is an example of a manner of determining a geographic location of the vehicle 302. In exemplary embodiments, the GPS 306 system should be accurate to within about 10 meters (e.g., GPS used by an OnStar system). Any system that provides geographic location data may be utilized in place of the GPS 306.

In exemplary embodiments, the lane determination module 308 is implemented by software instructions located on a processor (e.g., a microprocessor) within the vehicle 302. In alternate exemplary embodiments, the lane determination module 308 is implemented by hardware and/or software. The input device in the lane determination module 308 may be implemented by any method of receiving information into the lane determination module 308 from the map software 304 and the vision-based LS system 310. The input device may receive data via a network that is internal and/or external to the vehicle 302. In exemplary embodiments, one or more of the elements depicted in FIG. 3 (e.g., the lane sensing system 310 and the lane determination module 308) are combined into a single module and thus the input device may be a simple read command.

Figure 4:
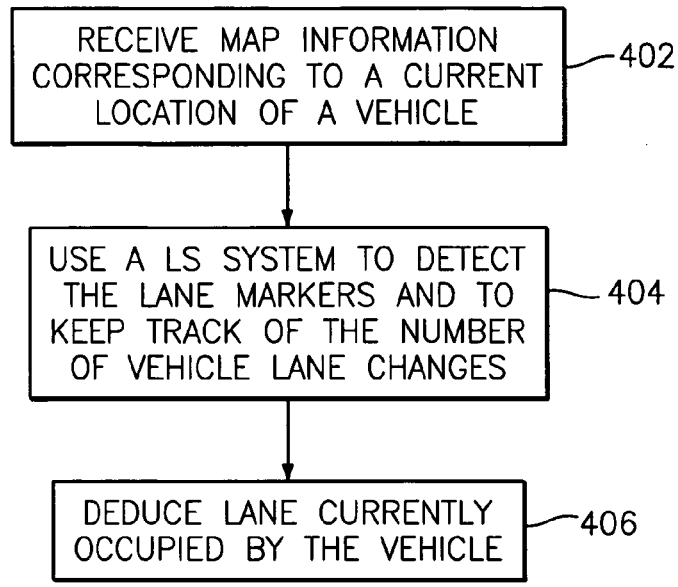
FIG. 4 is a process flow that may be implemented by exemplary embodiments of the present invention to determine a lane on a roadway currently occupied by a vehicle.

FIG. 4 is a process flow that may be implemented by exemplary embodiments to determine a lane on a roadway currently occupied by a vehicle. At block 402, map software 304 is utilized to determine map information for the roadway, which is the map information corresponding to a current GPS location of the vehicle. The map information is received at the lane determination module 308. In exemplary embodiments the map software 304 requests the GPS location from the GPS device 306 when the map software 304 acquires a request from the lane determination module 308 for map information. In alternate exemplary embodiments, the lane determination module 308 requests the GPS location from the GPS device 306 and then forwards the GPS location to the map software 304. The map software 304 then returns the map information to the lane determination module 308.

In exemplary embodiments, the information provided by the map data base 304 includes the number of lanes on the roadway. In alternate exemplary embodiments the map information from the map software 304 also includes a roadway type (e.g., highway, rural road), a lane marker type (e.g., reflector, painted) and/or an entrance point (e.g., left or right side) onto the roadway. In further alternate exemplary embodiments, depending on the information available from the map software 304, the lane marker type is more detailed including, for example, attributes (e.g., color, dotted/solid) of each of the lane markers.

At block 404, an LS system 310 is utilized to detect the lane markers and to keep track of the number and direction of vehicle lane changes. The information from the LS system 310 is received at the lane determination module 308.

At block 406, the lane currently occupied by the vehicle is determined. In exemplary embodiments, this is determined based on the data received from the LS system 310 that indicates the number of lanes on the roadway that have been crossed by the vehicle and their directions 302. This number is compared to the number of lanes on the roadway. Based on this comparison, the lane currently occupied by the vehicle 302 is determined. Once the lane currently occupied is determined, the LS system 310 may send an update to the lane determination module 308 when the vehicle 302 has changed a lane. Further, the LS system 310 may indicate to the lane determination module 308 whether the change was in the right direction or the left direction.

In exemplary embodiments, the LS system 310 keeps track of the relative lane number from the point of the vehicle 302 entrance on to the roadway. For example, in a four-lane road, a vehicle 302 enters onto the rightmost lane, it crosses two lanes to the left, then one lane to the right, and then crosses two lanes to the left again, and now the vehicle is in the leftmost lane.

Figure 5:
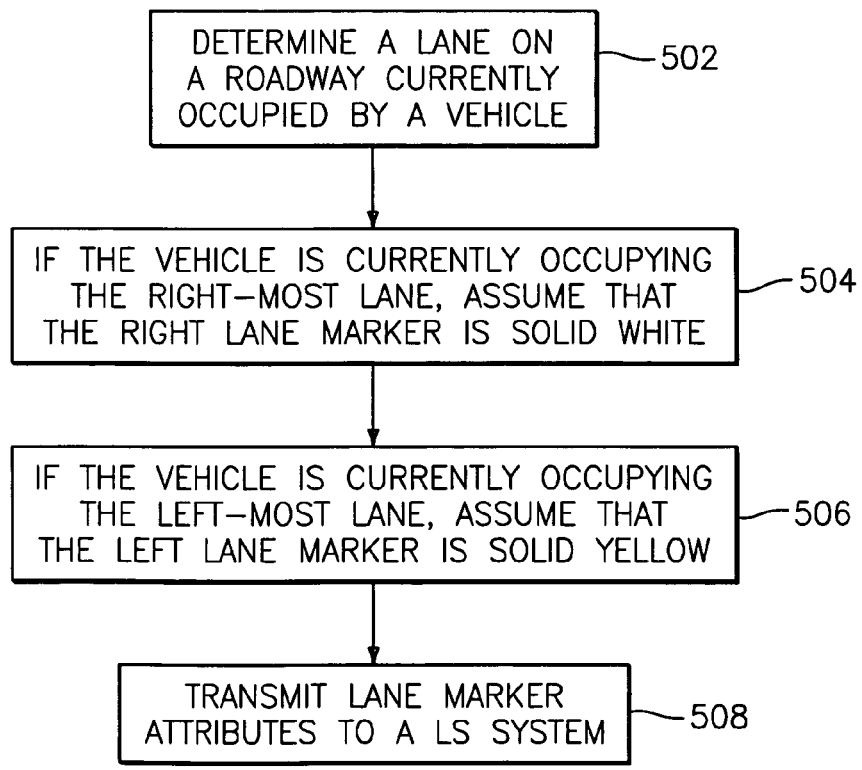
FIG. 5 is a process flow that may be implemented by exemplary embodiments of the present invention to determine an attribute of a lane marker.

FIG. 5 is a process flow that may be implemented by exemplary embodiments to determine an attribute of a lane marker. At block 502, the lane on the roadway currently occupied by the vehicle 302 is determined as discussed above in reference to FIG. 4. At blocks 504 and 506, the map information and the lane currently occupied by the vehicle 302 are utilized to assign attributes to lane markers to the left and/or right of the vehicle 302. At block 504, if the vehicle 302 is currently occupying the right-most lane of the roadway, the lane marker to the right of the vehicle is set to solid white. At block 506, if the vehicle 302 is currently occupying the left-most lane of the roadway, the lane marker to the left of the vehicle is set to solid yellow.

Emphasis has been placed on the left or right lanes, however it should be noted that other lanes of the roadway are always white and mostly dashed (they can also be solid or reflectors). This information can also be used by the vision system processor to enhance robustness.

At block 508, the attributes of the lane markers (if known) are transmitted to the LS system 310. The LS system 310 utilizes the attributes (e.g., color) to select filters for use in detecting the lane markers. If the attribute specifies a color of white, a filter(s) optimized for identifying white lane markers will be utilized by the LS system 310 to detect the lane marker. If the attribute specifies a color of yellow, a filter(s) optimized for detecting yellow lane markers will be utilized by the LS system 310 to detect the lane marker. Alternatively, or in addition, to using different filter types in response to attributes, the LS system 310 may utilize different types of algorithms in response to different attributes. In general, the algorithms required for detecting white lines are less complex than those required for detecting yellow lines. Thus, by knowing attributes about lane markers, such as the color, the LS system 310 may utilize the most efficient algorithms for detecting lane markers.

In addition, the lane determination module 308 may use the lane currently occupied by the vehicle 302 to identify the lane position relative to the roadway (e.g., rightmost, leftmost, center). The lane position on the roadway is transmitted to the LS system 310. In exemplary embodiments, the LS system 310 utilizes the lane position on the roadway information to determine what type of warning (or message), to transmit to the operator of the vehicle 302. For example, the LS system 310 may provide stronger warnings to a driver of the vehicle 302 if the vehicle is crossing the center line of a divided roadway or driving off of the roadway. The LS system 310 may issue different kinds of warnings to a driver of the vehicle 302 depending on whether the vehicle 302 is going off the roadway (e.g., the vehicle 302 is in the rightmost lane and crossing the right lane marker) or whether the vehicle 302 is moving into a different lane on the roadway.

Alternate exemplary embodiments support the detection of Bots Dots (special type of reflectors) on a roadway used to mark lanes. Currently, many roadways in southern states (e.g., California, Texas) have Bots Dots as sole lane markers and are without any painted lane markers. The image processing algorithms required to detect Bots Dots, or reflectors in general, are very different than the algorithms used to detect painted lane markings. Currently, the lane sensing image processor typically runs both algorithms simultaneously and has to make a decision as to which algorithm is the appropriate one and should be selected. Again, this requires extra computational burden and, at times, even inaccurate selection of an algorithm. In such driving scenarios, the information about Bots Dots (or reflectors) can be made available as part of the digital map attributes. This information may be provided to the image processor (e.g., as attributes of the lane markers as described above in reference to FIG. 5) which alleviates the required computational burden and results in a faster and more accurate algorithm selection.

Exemplary embodiments of the present invention may be utilized to fuse data from a digital map database with an image processor on a LS system to enhance the robustness of the LS system and to reduce the computational burden of the LS system. The ability to detect road departures as well as lane departures may lead to the enhanced robustness of the LS system. The ability to identify attributes of a lane marker (e.g., color, type) allows the LS system to utilize filters and algorithms that will detect the lane markers in a more efficient manner and reduce computational burden.

As described above, the embodiments of the invention may be embodied in the form of hardware, software, firmware, or any processes and/or apparatuses for practicing the embodiments. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for lane sensing, the method comprising:
   receiving map information corresponding to a current geographic position of a vehicle on a roadway, the map information including a number of lanes on the roadway; and
   determining which of the lanes on the roadway is currently occupied by the vehicle in response to the map information and to a number of lanes crossed by the vehicle on the roadway, where the number of lanes crossed by the vehicle is based on detecting lane markers on the roadway and determining a number of lane markers crossed by the vehicle.

2. The method of claim 1 further comprising assigning an attribute to at least one of a lane marker to the left of the vehicle and a lane marker to the right of the vehicle, the assigning responsive to the lane currently occupied by the vehicle.

3. The method of claim 2 wherein the attribute of the lane marker to the left of the vehicle is set to solid yellow if the lane currently occupied by the vehicle on the roadway is the leftmost lane on the roadway.

4. The method of claim 2 wherein the attribute of the lane marker to the right of the vehicle is set to solid white if the lane currently occupied by the vehicle on the roadway is the rightmost lane on the roadway.

5. The method of claim 2 further comprising transmitting the attribute to a lane sensing (LS) system.

6. The method of claim 5 wherein an image processor in the LS system adjusts a lane detection filter in response to the attribute.

7. The method of claim 5 wherein an image processor in the LS system selects a lane detection algorithm in response to the attribute.

8. The method of claim 1 further comprising identifying a lane position of the vehicle as one or more of rightmost, leftmost and center and transmitting the lane position to an LS system, wherein the LS system utilizes the lane position to determine a type of warning to transmit to an operator of the vehicle.

9. The method of claim 1 wherein the map information further includes an entrance point onto the roadway.

10. The method of claim 1 wherein the map information further includes a lane marker type, and the method further comprises assigning an attribute to at least one of a lane marker to the left of the vehicle and a lane marker to the right of the vehicle, the assigning responsive to the lane currently occupied by the vehicle and to the lane marker type.

11. The method of claim 10 wherein the attribute of the lane marker to the left of the vehicle is set to reflector if the lane currently occupied by the vehicle on the roadway is the leftmost lane on the roadway and the lane marker type is reflector, and the attribute of the lane marker to the right of the vehicle is set to reflector if the lane currently occupied by the vehicle on the roadway is the rightmost lane on the roadway and the lane marker type is reflector.

12. The method of claim 10 wherein the attribute of the lane marker to the left of the vehicle is set to solid yellow if the lane currently occupied by the vehicle on the roadway is the leftmost lane on the roadway and the lane marker type is painted line, and the attribute of the lane marker to the right of the vehicle is set to solid white if the lane currently occupied by the vehicle on the roadway is the rightmost lane on the roadway and the lane marker type is painted line.

13. The method of claim 10 wherein the lane marker type is one or more of reflector and painted line.

14. The method of claim 1 wherein the map information further includes a roadway type.

15. The method of claim 1 further comprising assigning an attribute to at least one of a lane marker to the left of the vehicle and a lane marker to the right of the vehicle, the assigning responsive to the map information.

16. A system for lane sensing, the system comprising:
an input device for:
receiving map information corresponding to a current geographic position of a vehicle on a roadway, the map information including a number of lanes on the roadway; and
a processor in communication with the input device, the processor including instructions for facilitating determining which of the lanes on the roadway is currently occupied by the vehicle in response to the map information and to a number of lanes crossed by the vehicle on the roadway, where the number of lanes crossed by the vehicle is based on detecting lane markers on the roadway and determining a number of lane markers crossed by the vehicle.

17. The system of claim 16 wherein the processor includes further instructions for facilitating assigning an attribute to at least one of a lane marker to the left of the vehicle and a lane marker to the right of the vehicle, the assigning responsive to the lane currently occupied by the vehicle.

18. The system of claim 17 wherein the attribute of the lane marker to the left of the vehicle is set to solid yellow if the lane currently occupied by the vehicle on the roadway is the leftmost lane on the roadway.

19. The system of claim 17 wherein the attribute of the lane marker to the right of the vehicle is set to solid white if the lane currently occupied by the vehicle on the roadway is the rightmost lane on the roadway.

20. The system of claim 16 wherein the processor includes further instructions for transmitting the attribute to an LS system.

21. A computer program product for vehicle-to-vehicle communication, the computer program product comprising:
a storage medium readable by a processing circuit and storing instructions for execution by the processing circuit for performing a method, the method including:
receiving map information corresponding to a current geographic position of a vehicle on a roadway, the map information including a number of lanes on the roadway; and
determining which of the lanes on the roadway is currently occupied by the vehicle in response to the map information and to a number of lanes crossed by the vehicle on the roadway, where the number of lanes crossed by the vehicle is based on detecting lane markers on the roadway and determining a number of lane markers crossed by the vehicle.

* * * * *